United States Patent
Rajagopal et al.

(10) Patent No.: US 8,855,496 B2
(45) Date of Patent: Oct. 7, 2014

(54) OPTICAL CLOCK RATE NEGOTIATION FOR SUPPORTING ASYMMETRIC CLOCK RATES FOR VISIBLE LIGHT COMMUNICATION

(75) Inventors: Sridhar Rajagopal, Plano, TX (US); Eran Pisek, Plano, TX (US); Farooq Khan, Allen, TX (US); Ying Li, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 12/975,225

(22) Filed: Dec. 21, 2010

(65) Prior Publication Data

US 2011/0164881 A1 Jul. 7, 2011

Related U.S. Application Data

(60) Provisional application No. 61/335,328, filed on Jan. 5, 2010.

(51) Int. Cl.
*H04B 10/00* (2013.01)
*H04B 10/114* (2013.01)
*H04B 10/116* (2013.01)

(52) U.S. Cl.
CPC .......... *H04B 10/116* (2013.01); *H04B 10/1149* (2013.01)
USPC ........... 398/128; 398/154; 398/155; 398/135; 398/136

(58) Field of Classification Search
CPC .. H04B 10/116; H04B 10/40; H04B 10/0779; H04B 10/1149; H04B 1/38; H04L 5/1446; H04L 1/0002; H04J 3/0614

USPC ................... 398/154, 155, 172, 135, 136, 138
See application file for complete search history.

(56) References Cited

U.S. PATENT DOCUMENTS

| | | | | |
|---|---|---|---|---|
| 6,424,636 | B1 * | 7/2002 | Seazholtz et al. | 370/295 |
| 6,542,039 | B1 * | 4/2003 | Ogura | 331/11 |
| 6,643,469 | B1 * | 11/2003 | Gfeller et al. | 398/162 |
| 7,009,949 | B1 * | 3/2006 | Gopalakrishnan et al. | 370/329 |
| 7,391,975 | B2 * | 6/2008 | Oettinger et al. | 398/129 |
| 7,447,437 | B2 * | 11/2008 | Schunk | 398/135 |
| 7,477,876 | B2 * | 1/2009 | Das et al. | 455/67.13 |
| 7,483,638 | B2 * | 1/2009 | Hayashi | 398/135 |
| 7,630,631 | B2 * | 12/2009 | Aronson et al. | 398/22 |
| 7,630,645 | B2 * | 12/2009 | Hong et al. | 398/107 |
| 7,653,448 | B2 * | 1/2010 | Zoso et al. | 700/94 |
| 7,836,199 | B2 * | 11/2010 | Brown et al. | 709/233 |
| 8,139,946 | B2 * | 3/2012 | Ann et al. | 398/128 |
| 8,374,201 | B2 * | 2/2013 | Rajagopal et al. | 370/476 |
| 8,452,188 | B2 * | 5/2013 | Shin et al. | 398/172 |
| 8,477,831 | B2 * | 7/2013 | Vijayaraghavan et al. | 375/220 |

(Continued)

*Primary Examiner* — Daniel Washburn
*Assistant Examiner* — Hibret Woldekidan

(57) ABSTRACT

A method and apparatus conduct an optical clock rate negotiation to support asymmetric clock rates for visible light communication (VLC) in a VLC device. A first frame that includes a receiver clock rate supported by a first VLC device is transmitted at a predetermined clock rate. A response frame that includes a receiver clock rate supported by a second VLC device is received from the second VLC device. A transmission clock rate of the first VLC device is selected based on the response frame from the second VLC device. Subsequent frames for data communication are transmitted to the second VLC device at the selected transmission clock rate of the first device. Alternatively, when conducting optical clock negotiation in the PHY layer, multiple clock rates are supported within a single frame.

28 Claims, 12 Drawing Sheets

(56) References Cited

U.S. PATENT DOCUMENTS

| | | | |
|---|---|---|---|
| 8,526,825 B2* | 9/2013 | Yamada et al. | 398/172 |
| 2004/0062553 A1* | 4/2004 | Harres | 398/168 |
| 2005/0068895 A1* | 3/2005 | Stephens et al. | 370/235 |
| 2007/0003282 A1* | 1/2007 | Boyd et al. | 398/72 |
| 2008/0101338 A1* | 5/2008 | Reynolds et al. | 370/352 |
| 2008/0108352 A1* | 5/2008 | Montemurro et al. | 455/437 |
| 2008/0131134 A1* | 6/2008 | Dreischer et al. | 398/128 |
| 2008/0225898 A1* | 9/2008 | DeLew et al. | 370/503 |
| 2009/0109913 A1* | 4/2009 | Won et al. | 370/329 |
| 2010/0074190 A1* | 3/2010 | Cordeiro et al. | 370/329 |

* cited by examiner

OPTICAL CLOCK RATE NEGOTIATION FOR SUPPORTING ASYMMETRIC CLOCK RATES FOR VISIBLE LIGHT COMMUNICATION

CROSS-REFERENCE TO RELATED APPLICATION(S) AND CLAIM OF PRIORITY

The present application is related to U.S. Provisional Patent Application No. 61/335,328, filed Jan. 5, 2010, entitled "MULTIPLE CLOCK SUPPORT FOR VISIBLE LIGHT COMMUNICATION". Provisional Patent Application No. 61/335,328 is assigned to the assignee of the present application and is hereby incorporated by reference into the present application as if fully set forth herein. The present application hereby claims priority under 35 U.S.C. §119(e) to U.S. Provisional Patent Application No. 61/335,328.

TECHNICAL FIELD OF THE INVENTION

The present application relates generally to visible light communication (VLC) and, more specifically, to an apparatus and a method for supporting multiple clocks in a VLC device.

BACKGROUND OF THE INVENTION

Visible light communication (VLC) is a new technology for short-range optical wireless communication using visible light in optically transparent media. This technology provides access to several hundred terahertz (THz) of unlicensed spectrum. VLC is immune to the problems of electromagnetic interference and non-interference associated with radio frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures. A VLC network is any network of two or more devices that engage in VLC.

The IEEE 802.15.7 standard supports multiple applications such as peer-to-peer communication, visible LAN communication, broadcasting/multicasting applications and vehicular applications. The characteristics of the optical sources used for these applications vary greatly, and the switching frequency can range from 100s of KHz (e.g., for a traffic light LED) to 100s of Mbps (e.g., for a laser diode or a resonant-cavity LED). As such, using the clock rate that is supported by two communicating devices would decrease the efficiency. Thus, the IEEE 802.15.7 standard enables support for a variety of optical sources and applications. This requires the support of multiple clock frequencies in the standard as not all optical sources may be able to support all switching frequencies needed to achieve high data rates.

Due to the fact that different optical sources (LEDs) have different switching capabilities, and not all optical sources can support the high clock speeds, there is a need to support multiple clock speeds for VLC.

SUMMARY OF THE INVENTION

A method of optical clock rate negotiation to support asymmetric clock rates for visible light communication (VLC) in a first device is provided. The method includes transmitting, at a predetermined clock rate, a first frame comprising a receiver clock rate supported by the first device. A response frame that includes a receiver clock rate supported by a second device is received from the second device. A transmission clock rate of the first device is selected based on the response frame from the second device. Subsequent frames for data communication are transmitted to the second device at the selected transmission clock rate of the first device.

An apparatus optical clock rate negotiation to support asymmetric clock rates for visible light communication (VLC) in a first device is provided. The apparatus includes a transmitter that includes an optical source and is configured to transmit VLC signals. A receiver includes a photodetector and is configured to receive VLC signals. A controller is coupled to the transmitter and the receiver. The controller transmits, at a predetermined clock rate, a first frame comprising a receiver clock rate supported by the first device. The controller also receives a response frame that includes a receiver clock rate supported by a second device from the second device. The controller also selects a transmission clock rate of the first device based on the response frame from the second device and transmits subsequent frames for data communication to the second device at the selected transmission clock rate.

A method for supporting multiple clocks in a PHY layer of a first visible light communication (VLC) device is provided. A first portion of a frame is transmitted at a first clock rate. The first portion of the frame includes a first locking pattern and a header comprising a second clock rate. A second portion of the frame is transmitted at the second clock rate. The second portion of the frame includes a second locking pattern and a payload.

An apparatus for supporting multiple clocks in a MAC layer of a first visible light communication (VLC) device is provided. The apparatus includes a transmitter that includes an optical source and is configured to transmit VLC signals. A controller is coupled the transmitter and is configured to transmit a first portion of a frame at a first clock rate and a second portion of the frame at a second clock rate. The first portion of the frame includes a first locking pattern and a header that includes a second clock rate. The second portion of the frame includes a second locking pattern and a payload.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Visible Light Communication (VLC) device. This invention may, however, be embodied in many different forms and should not be construed as limited to the embodiments set forth herein. Rather, the disclosed embodiments are provided such that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

Figure 1:
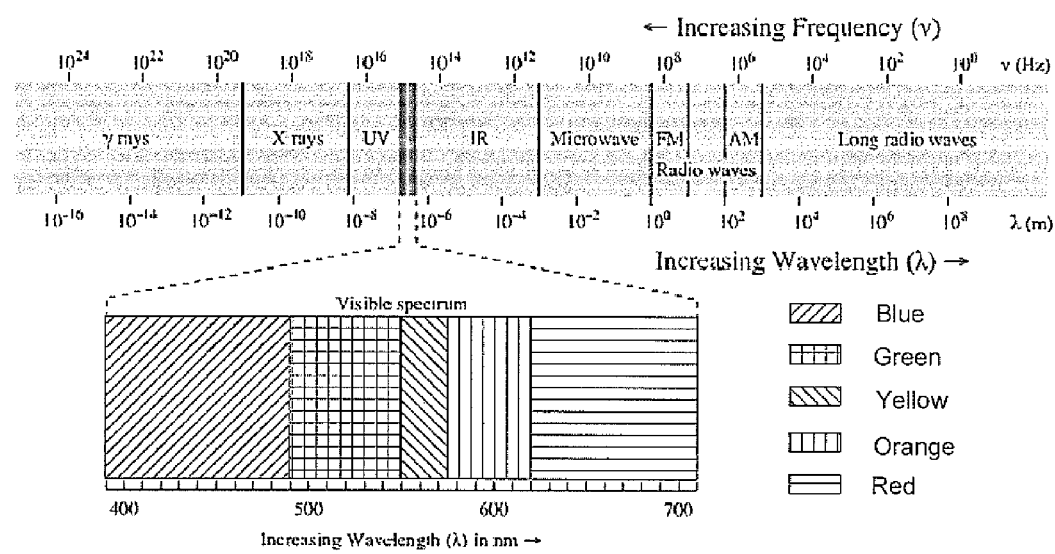
FIG. 1 illustrates the full electromagnetic frequency spectrum, and a breakout of the wavelengths occupied by visible light according to the principles of the present disclosure.

FIG. 1 illustrates the full electromagnetic frequency spectrum, and a breakout of the wavelengths occupied by visible light according to the principles of the present disclosure. Within the electromagnetic frequency spectrum lies the visible light spectrum which extends from 380 nm to 780 nm in wavelength. In essence this spectrum corresponds to a frequency range of approximately 400 to 790 THz. This relatively wide spectrum supports light sources with multiple colors, providing multiple channels for communication.

The blown up portion of the visible light spectrum is a rough mapping of wavelength range to a color of light. The transition between colors in the visible light spectrum is actually gradual.

Figure 2:
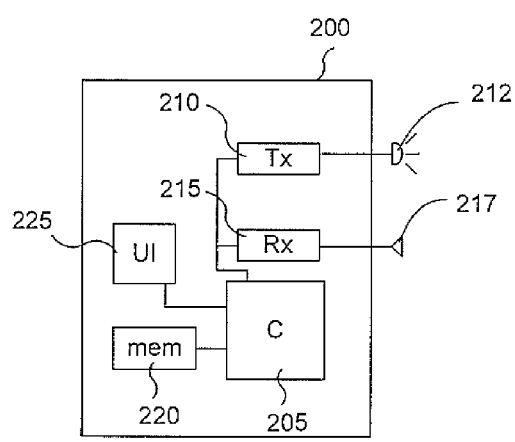
FIG. 2 illustrates an example of the variation in spectral width and wavelength for different types of light sources that could cause interference according to the principles of the present disclosure.

FIG. 2 illustrates a VLC device according to embodiments of the present disclosure. The VLC device 200 shown in FIG. 2 is for illustration only. Other embodiments could be used without departing from the scope of this disclosure.

The VLC device 200 may be any type of electronic device capable of transmitting and/or receiving colored visible light. For example, and without limitation, the VLC device 200 may be a cellular phone, Personal Data Assistant (PDA), a smart phone, portable computer, a headset, a health monitor device, a sensor, an access point, a remote control, a personal storage device, a video display device, a remote beam-finder, a global positioning system device, an automobile, or a media device (such as a video recorder, MP3 player, or the like).

The VLC device 200 may include a controller 205. The controller 205 may be a microcontroller, processor, or processor array configured to control the operations of the VLC device 200. The controller may be configured to support multiple clock frequencies for transmitting and receiving data. In some embodiments, the controller 205 is configured to pair VLC device 200 with another VLC device.

The VLC device 200 may include at least one of a transmitter 210 and receiver 215 coupled to the controller 205. In some embodiments, the transmitter 210 and receiver 215 may be the main transmission/reception devices for VLC device 200 and may be coupled to the controller 205 via an interface (not illustrated) that is adapted to enable the controller 205 to support multiple clock frequencies in the physical (PHY) layer or the Media Access Control (MAC) layer.

The transmitter 210 includes a transmit path (Tx) configured to transmit data signals and messages via one or more light sources 212. The light source 212 may be any optical light source that emits visible light. For example, the light source 212 may be, for example, a light emitting diode (LED), laser diode (LD), LED lamp, and solid state lamp. Although only one light source 212 is shown on VLC device 200, the transmitter 210 may be coupled to multiple light sources.

The receiver 215 includes a receive path (Rx) configured to receive data signals and messages via a light sensor 217. The light sensor is any component that is capable of detecting light such as, but not limited to, a photodetector (PD). In some embodiments, not specifically illustrated, the VLC device 200 includes the transmitter 210 and the receiver 215 as a single transceiver.

The VLC device 200 may also include a memory 220. According to some embodiments, controller 205 is operable to store information in the memory 220. Memory 220 can be any computer readable medium, for example, the memory 220 can be any electronic, magnetic, electromagnetic, optical, electro-optical, electro-mechanical, and/or other physical device that can contain, store, communicate, propagate, or transmit a computer program, software, firmware, or data for use by the controller 205 or other computer-related system or method. In some such embodiments, the controller 205 is configured to execute a plurality of instructions stored in memory 220 or a separate memory (not illustrated) configured to cause the controller 205 to perform a number of operations of the VLC device 200. In some embodiments, not specifically illustrated, the controller 205 may include a built-in memory.

In some embodiments, the VLC device 200 may include a User Interface (UI) 225. The UI 225 is coupled to the controller 205. The UI 225 is configured to receive one or more inputs from a user in order to direct a function of the VLC device 200. For example and not limitation, the UI 225 can be configured to place the VLC device 200 in a pair mode such that the VLC device 200 commences a search operation to communicate or connect with other VLC devices. In some embodiments, the UI 225 can be an Input/Output (I/O) port adapted to couple to an external device, such as, for example, a personal computer, such that the user can use the external device to direct operations or store data, such as, for example, media data, in the VLC device 200. In some embodiments, not specifically illustrated, the UI 225 is optional.

Figure 3:
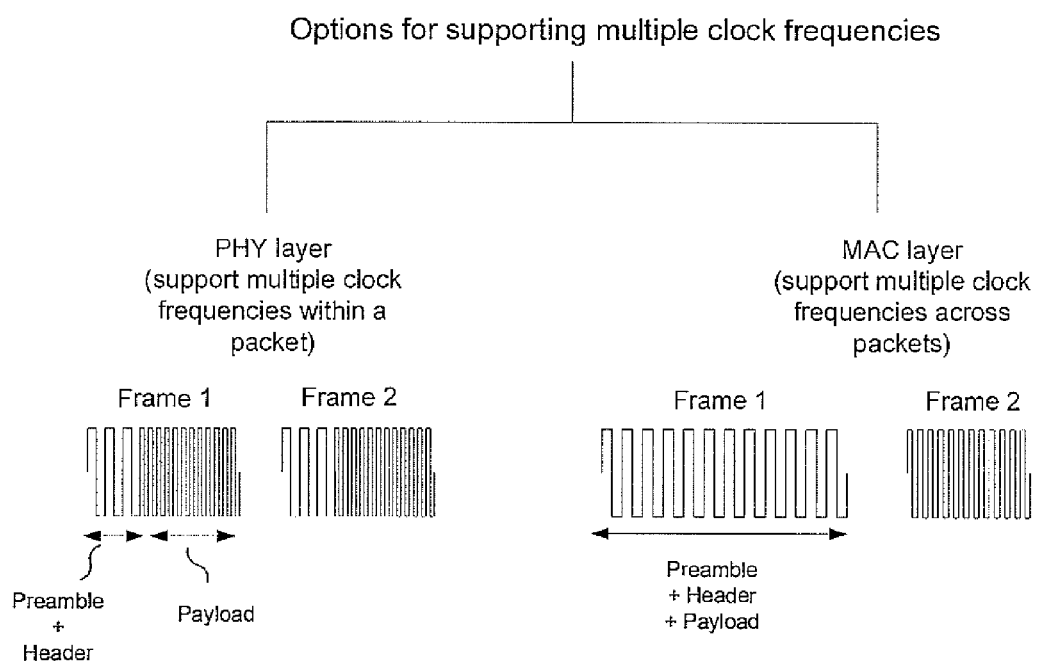
FIG. 3 illustrates signals for supporting multiple clock frequencies for VLC in the PHY and MAC layers, according to embodiments of the present disclosure.

The present disclosure describes embodiments that support multiple clock frequencies in the physical (PHY) layer or the Media Access Control (MAC) layer. FIG. 3 illustrates signals for supporting multiple clock frequencies for VLC in the PHY and MAC layers, according to embodiments of the present disclosure. As illustrated, embodiments that support multiple clock frequencies in the PHY layer support multiple clock frequencies within a single frame (or packet). In contrast, embodiments that support multiple clock frequencies in the MAC layer support multiple clock frequencies across frames (i.e. the clock frequency does not change within a frame).

Additionally, the embodiments accommodate multiple topologies with multiple clocks and multiple data rates for each clock. The present disclosure makes note of the fact that, for VLC, the transmitter and receiver are independent chains and may support different clock ranges. For example, a VLAN access point may be able to transmit only at 5 MHz due to its LED but may be able to receive data at 50 MHz due to its photodetector. A virtual local area network (VLAN) access point (AP) may have high transmit power but low switching frequency for the downlink. A VLC device may have low transmission power but may use coding gain at a higher switching frequency to communicate efficiently with the AP for the uplink. Furthermore, the embodiments of the present disclosure support the separation of clock rate ranges between the transmitter and receiver on a per device basis.

PHY Layer Support for Multiple Clock Frequencies

Figure 4:
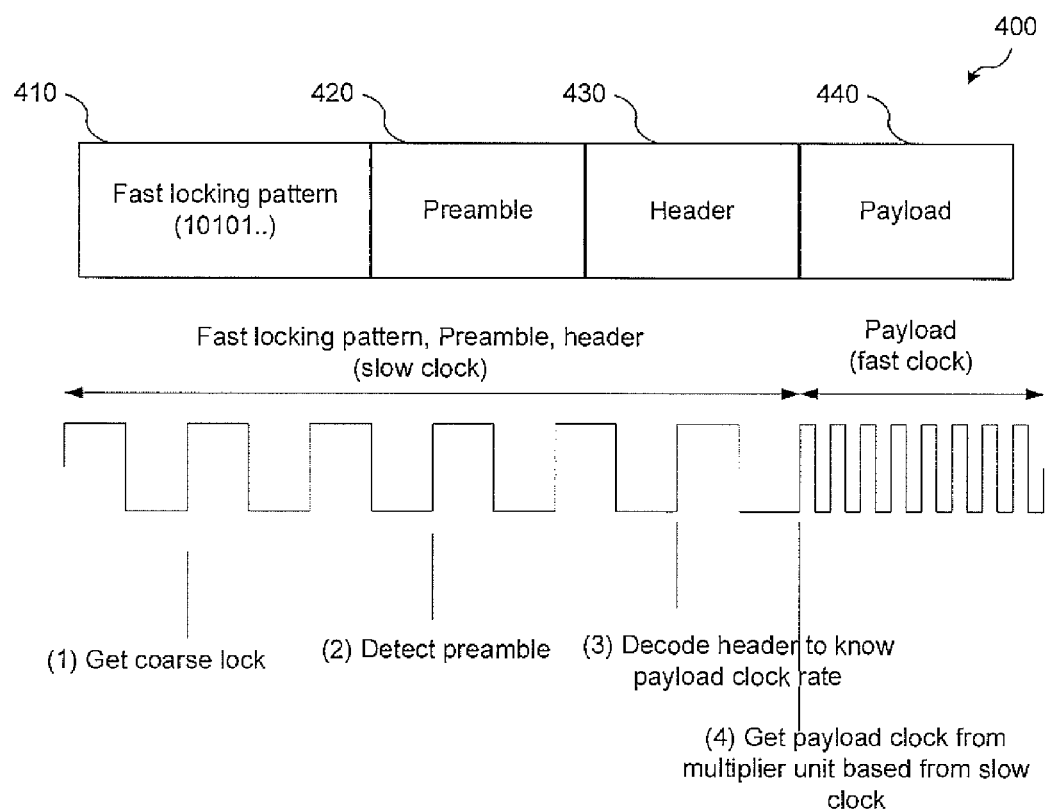
FIG. 4 illustrates a process in the PHY layer for supporting multiple clocks during a frame transmission, according to an embodiment of the present disclosure.

Embodiments for supporting multiple clock frequencies in the PHY layer involve using multiple clocks within a single frame (or packet) transmission. FIG. 4 illustrates a process in the physical (PHY) layer for supporting multiple clocks during a frame transmission, according to an embodiment of the present disclosure.

The transmission frame 400 includes a fast locking pattern 410, a preamble 420, a header 430, and a payload 440. As illustrated, the fast locking pattern 410, preamble 420, and header 430 are with a slow clock frequency. The fast locking pattern 410 is transmitted first in the slowest clock frequency (lowest data rate) in order to establish the link. That is, the fast locking pattern 410 is used at the receiving end to get a coarse lock on the signal. This is done to maximize the transmission range for link establishment. Also, not all optical transmitters may be able to transmit at the higher data rates. Hence, until the link has been established and the supported data rates are known to both the transmitter and receiver, it may not be possible to use the higher data rates. Next, the preamble 420 is transmitted in the slowest clock frequency to allow the receiver to verify that the frame 400 is valid. The header 430, which is also transmitted at the slowest clock frequency, includes information about the payload 440, such as the payload clock rate and the payload size.

Once the header 430 is decoded, the clock rate for the higher data rates may be obtained from the header. The receiver clock may be adjusted automatically and maintains its phase synchronization with the slower base clock. Multiple clock frequencies, which are integral multiples of the base clock frequency, can be generated at the receiver. Some example base frequencies for low rate PHY are 200 kHz and 600 kHz, and some example base frequencies for high rate PHY are 6 MHz, 12 MHz, 24 MHz, 60 MHz, and 120 MHz. The appropriate clock frequency for the payload 300 is selected based on a data rate table. Tables 1 and 2 provide examples of possible data rates for the low rate PHY (PHY I) and the high rate PHY (PHY II).

TABLE 1

Clock Rates For Low Rate PHY

| | Optical rate | Modulation | Line coding | FEC | Data rate |
|---|---|---|---|---|---|
| PHY I | 200 kHz | OOK | Manchester | 1/16 | 6.25 kbps |
| | 200 kHz | OOK | Manchester | 1/8 | 12.5 kbps |
| | 200 kHz | OOK | Manchester | 1/4 | 25 kbps |
| | 200 kHz | OOK | Manchester | 1/2 | 50 kbps |
| | 200 kHz | OOK | Manchester | 1 | 100 kbps |
| | 600 kHz | VPM | 4B6B | 1/2 | 200 kbps |
| | 600 kHz | VPM | 4B6B | 1 | 400 kbps |

TABLE 2

Clock Rates For High Rate PHY

| | Optical rate | Modulation | Line coding | FEC | Data rate |
|---|---|---|---|---|---|
| PHY I | 6 MHz | VPM | 4B6B | 4/5 | 3.2 Mbps |
| | 12 MHz | VPM | 4B6B | 4/5 | 6.4 Mbps |
| | 24 MHz | OOK | 8B10B | 1/2 | 9.6 Mbps |
| | 60 MHz | OOK | 8B10B | 1/2 | 24 Mbps |
| | 60 MHz | OOK | 8B10B | 4/5 | 38.4 Mbps |
| | 120 MHz | OOK | 8B10B | 4/5 | 76.8 Mbps |
| | 120 MHz | OOK | 8B10B | 1 | 96 Mbps |

At the transmitter end, there may be multiple ways of achieving the switch from the slow clock to fast clock, as the transmitter can generate the slower clock off of a faster clock. For example, if the slower clock is half the speed of the fast clock, the transmitter can send a '11001100 . . . ' pattern of the fast clock to generate an equivalent slow clock used in the preamble and header and then use the '1010 . . . ' pattern for the payload.

Figure 5:
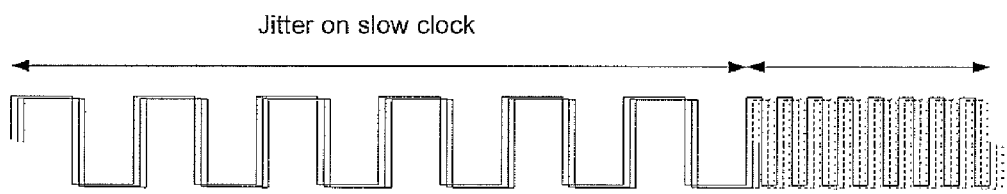
FIG. 5 illustrates a jitter problem that may be caused by the process of FIG. 4.

However, a drawback with this embodiment is that the receiver clock usually cannot accurately predict the slower clock phase to the accuracy desired by the higher speed clock. The clock phase is affected by factors such as delay spread due to the optical wireless channel, jitter at the transmitter, phase estimation error at the receiver, and so forth. The jitter problem is illustrated in FIG. 5. Hence, when the higher speed clock occurs immediately after the header 430, the jitter becomes magnified by the ratio of the clock frequencies between the lower and higher speed clock. For example, in a high rate PHY, the jitter may be magnified by a factor of 20×, such that transmitting end and the receiving end may be out of sync by an entire clock cycle.

Figure 6:
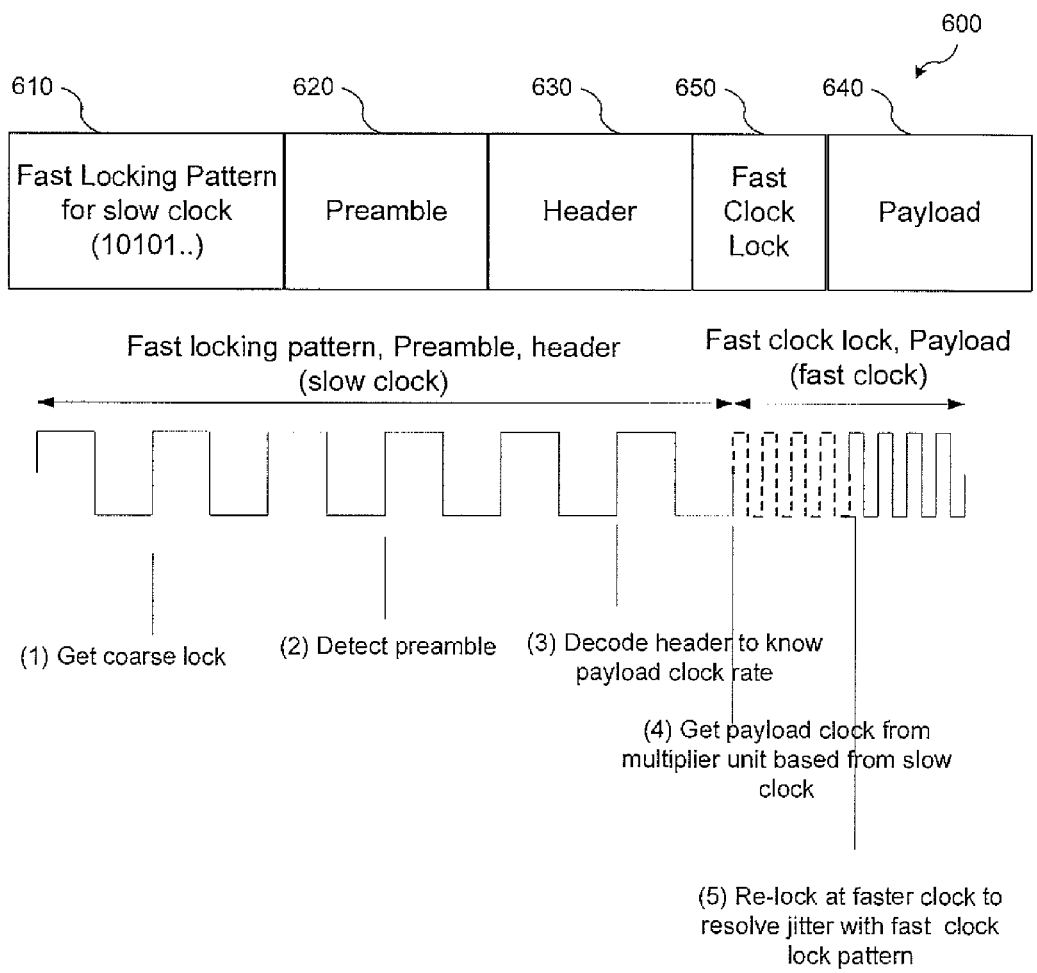
FIG. 6 illustrates a process in the PHY layer for supporting multiple clocks and resolving jitter during a frame transmission, according to an embodiment of the present disclosure.

FIG. 6 illustrates a process in the PHY layer for supporting multiple clocks and resolving jitter during a frame transmission, according to an embodiment of the present disclosure. Frame 600 includes a fast locking pattern 610, a preamble 620, a header 630, payload 640, and a fast clock lock 650. Fast locking pattern 610, a preamble 620, a header 630, and payload 640 are analogous to the fast locking pattern 410, preamble 420, header 430, and payload 440 of frame 400. In addition, a fast clock re-locking pattern 650 is introduced between the header 630 and the payload 640. Unlike the fast locking pattern 610, the fast clock re-locking pattern 650 has the same clock rate as the fast clock used in the payload 640. The fast clock locking pattern has a unique identifier which signals the ending of this pattern and the beginning of the payload 640. A phase-locked loop (PLL) may use this fast clock locking pattern 650 in order to resolve the jitter magnification caused by the base slower clock.

In some embodiments, the fast re-locking pattern 650 may comprise two parts. The first part may be used for re-locking (re-synchronizing), and the second part may be a delimiter that is used to identify the end of the fast re-locking pattern 650 and the beginning of the payload 640.

Figure 7:
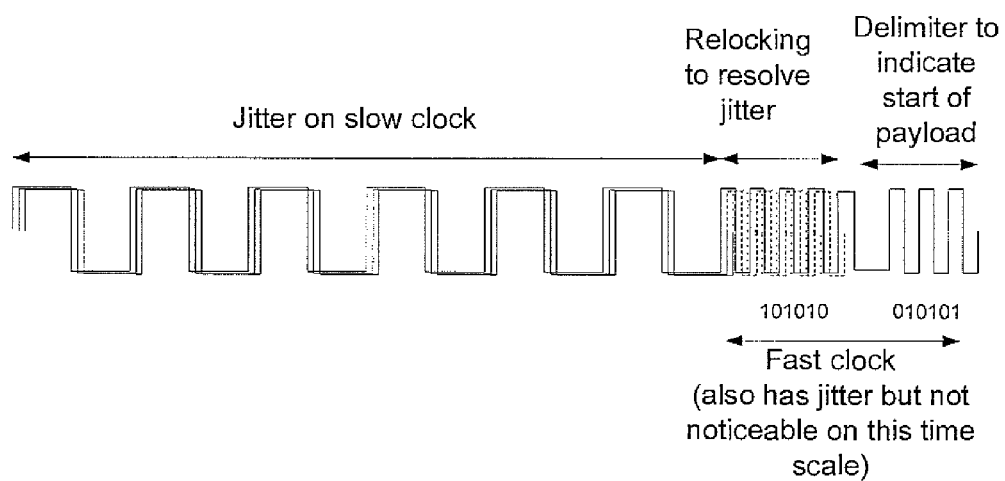
FIG. 7 illustrates a signal diagram for when maximum transition sequences are used in the fast re-locking pattern to resolve jitter, according to an embodiment of the present disclosure.

FIG. 7 illustrates a signal diagram for when maximum transition sequences are used in the fast re-locking pattern to resolve jitter, according to an embodiment of the present disclosure. In an embodiment, the bit sequence of the first part of the fast re-locking pattern may be a maximum transition sequence (e.g. '101010' or '010101') to maximize the re-locking probability, and the bit sequence of the second part (delimiter) is the opposite maximum transition sequence. The maximum transition sequence is used to initiate a quick re-locking and to minimize the length of the relocking pattern for the fast clock. For example, '101010 . . . ' may be used for the first part for re-sync while '010101 . . . ' may be used for the second part.

The transition between '101010 . . . ' and '01010 . . . ' has two consecutive zeros ('00') at the boundary (or could also '11' at the boundary) between the first part and the second part. The transition provides an indication to the receiver as to the starting point of the payload after the reception of the second part of this length. In an embodiment the fast clock re-locking pattern may be a 16-bit pattern in which each of the first part and the second part comprise 8-bit maximum transition sequences (e.g. '10101010' for the first part and '01010101' for the second part).

In some embodiments, the length of the fast clock re-locking pattern may be a function of the increase in clock speed ratio. For example, as the difference between the base clock and the payload clock increases, the pattern length is also increased appropriately, as shown in Table 3. In an embodiment, the fast clock re-locking pattern need not be deployed if there is no increase in clock frequency. It is required only for use when the clock is switched to a higher clock frequency in the payload.

TABLE 3

Fast Lock Relocking Sequence Length Variation With Clock Speed

| PHY | Clock Speed | Pattern Length |
| --- | --- | --- |
| Low rate | 200 KHz | 0 |
|  | 600 KHz | 8 |

TABLE 3-continued

Fast Lock Relocking Sequence Length Variation With Clock Speed

| PHY | Clock Speed | Pattern Length |
| --- | --- | --- |
| High rate | 6 MHz | 0 |
|  | 12 MHz | 8 |
|  | 24 MHz | 16 |
|  | 60 MHz | 40 |
|  | 120 MHz | 80 |

MAC Layer Support for Multiple Clock Frequencies

In the MAC layer, multiple clock frequencies are supported across frames. As such, the clock frequency does not change within a frame. As shown in FIG. 3, the first frame is sent at a slow clock frequency. This is because the transmitting VLC device does not know whether the receiving device is able to support a faster clock frequency. As such, according to an embodiment, the first frame is transmitted at the slowest clock frequency to ensure that a link can be established with a receiving VLC device. Once the link is established, the two devices may communicate using higher data rates at faster clock frequencies.

Embodiments of the present disclosure support multiple optical clock rates in order to accommodate a wide variety of optical sources and receivers. Embodiments of the present disclosure also support the use of asymmetric clock rates between two devices because the transmitter and receiver in a device are independent and may support different clock rate ranges. As an example, an infrastructure transmitter (e.g. an access point) may be unable to switch rapidly but may be able to transmit with high power and require lower error correction while a mobile device transmitter may be able to switch rapidly but may require higher error correction support due to its lower transmit power. The optical clock rate for communication is established using the MAC and can be communicated to the receiver prior to data transfer. The clock rate selection and negotiation procedure is described with regard to various embodiments disclosed in the following paragraphs.

Embodiments that support multiple clock frequencies at the MAC layer, use the following guidelines. 1) All specified clock rates (frequencies) that are less than the maximum supported clock rate in a given device will also be supported in that device. 2) If a clock rate is supported, all data rates associated with that clock rate will be supported. 3) The preamble, header, and payload will have the same clock rate. 4) The header will be sent at the lowest data rate for the chosen clock rate. 5) The payload may choose any data rate that belongs to the chosen clock rate.

Furthermore, and as will be described in various embodiments, each VLC device may determine the transmission (TX) clock frequencies automatically or manually.

Figure 8:
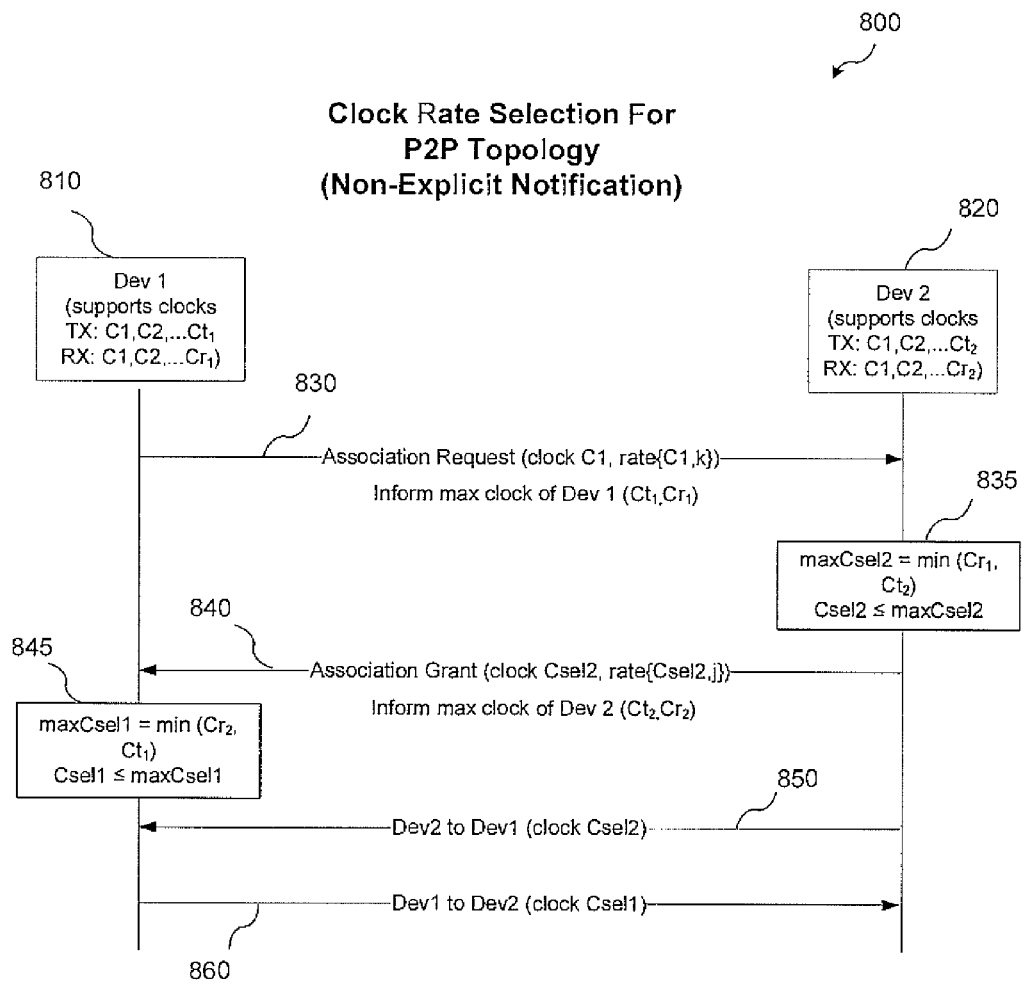
FIG. 8 illustrates a process for automatically determining the clock rate for transmission in a P2P network according to an embodiment of the present disclosure.

FIG. 8 illustrates a process for automatically determining the clock rate for transmission in a P2P network according to an embodiment of the present disclosure. That is, a VLC device (e.g. device 810) exchanges and selects the clock rate for transmission for a P2P network, without its receiver having a priori information about the transmitter clock of the other VLC device (e.g. device 820).

In process 800, device 810 supports a set of clock rates (C1, C2, . . . $C_{t1}$) at the transmitter, such that $C_{t1}$ is the maximum clock rate supported by the transmitter at device 810. Also, C1<C2< . . . <$C_{t1}$. Within a PHY type, the clock rates are integral multiples of each other to make the clock generation and selection simple at the transmitter (i.e. $C_{i+1}/C_i$=m, which is an integer). The receiver at device 810 may support more or less clock rates than the transmitter because the receiver circuit is physically independent of the transmitter clock. The transmitter clock is restricted to the clocks supported by the optical source while the receiver clock is restricted by the photodetector.

Device 810 also supports a set of optical clock rates (C1, C2, ... $C_{r1}$) at the receiver, such that $C_{r1}$ is the maximum clock rate supported at the receiver of device 810. Also, C1<C2< ... <$C_{r1}$. Similarly, $C_{t2}$ and $C_{r2}$ are the maximum clock rates supported by the device 820.

Support for the lowest clock rate C1 is mandatory at both the transmitter and receiver for all devices i.e. t1, t2, r1, r2≥1. For every clock rate, there is an associated set of data rates at the physical layer. This data rate is dependent on the modulation, line coding and Forward Error Correction (FEC) used at the physical layer for a given clock rate. In an embodiment, there is a data rate table rate $\{C_i, j\}$ associated with each clock rate $C_i$, where j is the data rate index associated with clock rate $C_i$. The data rate table may be a common standard adopted by all VLC devices. As such, the data rate is represented by rate $\{C_i, p\}$, where $C_i$ is the chosen clock rate and p is a data rate index for the chosen clock rate such that $1 \leq p \leq N(C_i)$, where $N(C_i)$ is the number of physical layer rates associated with clock rate $C_i$.

Device 810 sends the Association Request (AR) 830 at the lowest clock rate C1 and at a physical layer data rate, rate $\{C1, k\}$. The data rate index 'k' is typically is chosen to be the lowest data rate that ensures maximum range and reliability for the given clock rate. In AR 830, the device 810 also informs the device 820 of the rates supported by its transmitter and receiver. In an embodiment, the device 810 only informs the device 820 of the maximum clock rates supported by its transmitter and receiver ($C_{t1}$, $C_{r1}$)

Device 820 receives the AR 830 and proceeds to select a clock rate for transmission in block 835. In an embodiment, device 820 compares its own supported clocks with the maximum clock rates that are supported by device 810. In order for it to communicate, it must select a clock rate Csel2 that is equal to or lower than maxCsel2, which is the minimum (i.e. lesser) of the maximum transmitter clock rate ($C_{t2}$) supported by device 820 and the maximum receiver clock rate ($C_{r1}$) supported by device 810. This is to ensure that clock rate selected by device 820 to transmit data to device 810 is supported by device 810. The exact choice of clock rate selected by each VLC device may be implementation specific, based on performance and/or throughput needs as long as the selected clock meets the above criteria. Device 820 then sends an Association Grant (AG) 840 back to device 810 at the selected clock rate, Csel2. In addition, device 820 also provides information regarding its own supported clock rates (or the maximum clock rates supported by its transmitter and receiver ($C_{t2}$, $C_{r2}$) to device 810 and uses Csel2 as the base clock for future P2P transmissions 850 to device 810.

Device 810 receives the AG 840 and proceeds to select a clock rate, Csel1, for transmission in block 845. Block 845 is analogous to block 835. That is, device 810 selects a clock rate Csel1 that is equal to or lower than maxCsel1, which is the minimum of the maximum transmitter clock rate ($C_{t1}$) supported by device 810 and the maximum receiver clock rate ($C_{r2}$) supported by device 820. Device 810 then uses clock rate Csel1 for future transmissions 860 to device 820.

The decision as to whether to use clock rates for transmission that are lower than maxCsel1 and maxCsel2 at device 810 and device 820, respectively, depends on the performance and throughput needs at each device. Each of VLC devices 810 and 820 may also decide to change the clock rate at anytime during communication for performance, throughput, or any other reason, as long as the new clock rate is not greater than maxCsel1 and maxCsel2 for transmission at devices 810 and 820, respectively. In an embodiment, there is requirement that the receiver at each VLC device shall support receiving data at clock rates that are equal to or below its maximum receiver clock rate without a priori knowledge of the exact transmitter clock rate. The chosen data rate may also be selected to maximize robustness and range or throughput, which would subsequently be dependent on the chosen clock rate.

Although the described embodiments assume clock rates to be integral multiples of each other, this is only for simplification in the description and is not intended to be a limitation for this disclosure.

Figure 9:
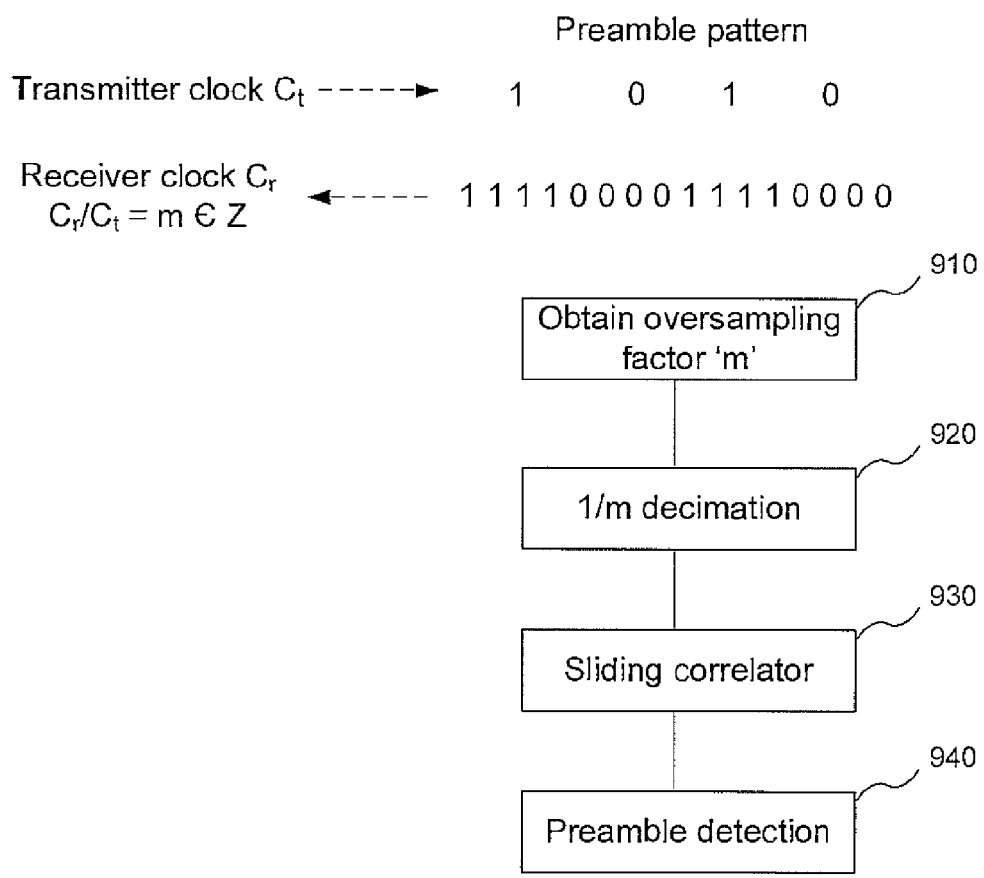
FIG. 9 illustrates a process for detecting a preamble at a receiver without prior knowledge of the transmitter clock rate according to an embodiment of the present disclosure.

FIG. 9 illustrates a process for detecting a preamble at a receiver without prior knowledge of the transmitter clock rate according to an embodiment of the present disclosure. Because the clock rates are multiples of each other, the receiver at each VLC device is essentially oversampling the received data. For example, when device 810 transmits data to device 820 using clock rate Csel1, Csel1 cannot be greater than the maximum receiver clock rate ($C_{r2}$) supported by device 820.

Based on the pattern of transitions seen in the data, the receiver can obtain the oversampling factor 'm' for the clock in block 910. In block 920, received data is decimated based on the 'm'. In block 930, a sliding correlation is performed on the decimated data to recover a signal, and in block 940, the preamble is detected, allowing further processing of the received frame. The receiver can also search over different oversampling factors 'm' because the number of clocks supported in the standard is small and finite.

Figure 10:
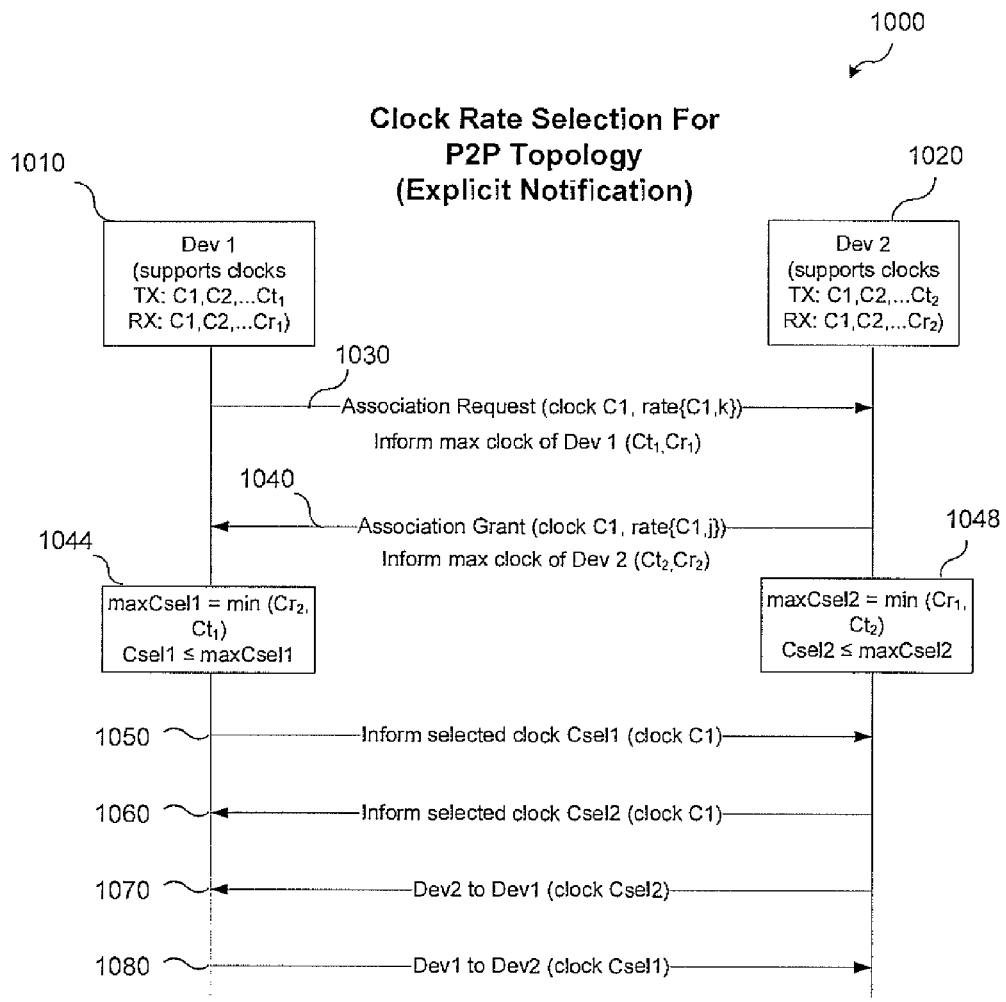
FIG. 10 illustrates a process for manually determining the clock rate for transmission in a P2P network according to an embodiment of the present disclosure.

FIG. 10 illustrates a process for manually determining the clock rate for transmission in a P2P network according to an embodiment of the present disclosure. Process 1000 is an alternative clock rate selection method for P2P topology with respect to process 800 in that explicit notification (i.e. a priori knowledge) of clock rate changes are provided between device 1010 and 1020 before either device changes its clock rate.

The AR 1030 is analogous to AR 830 of process 800. However, when the device 1020 sends the AG 1040 back to the device 1010, it does so at the same lowest clock rate C1 supported by all devices. Device 1010 then selects a clock rate, Csel1, for transmission in block 1044, and device 1020 selects the clock rate, Csel2, for transmission in block 1048. Blocks 1044 and 1048 are analogous to blocks 835 and 845 of process 800.

Devices 1010 and 1020 then exchange the respective selected clock frequencies using a clock rate change notification (1050 and 1060, respectively), using the slowest clock frequency C1, for future communication before switching to their selected clock frequencies, Csel1 and Csel2, respectively. Furthermore, a clock rate change notification must be sent prior to any subsequent clock rate changes at the transmitter. For example, if device 1010 decides to change its transmission clock rate to a new clock rate Csel1', device 1010 must first send a clock rate change notification to device 1020 using the previously selected clock rate Csel1. The clock rate change notification will inform device 1020 of the newly selected clock rate Csel1'. Afterwards, device 1010 may transmit subsequent frames to device 1020 using clock rate Csel1'. The advantage is that each of devices 1010 and 1020 do not have to detect the oversampling factor and can expect the receiver to respond at a known clock rate. The disadvantage is that explicit notification may cause a slight throughput reduction. However, because this is a one-time communication for association between devices, the throughput loss may be acceptable.

In an embodiment, explicit notification may be the default notification method for clock rate change that is supported by all devices, while the automatic detection of clock rate change may be the preferred method when supported by a device. Alternatively, in some embodiments, the devices may not support (or prefer) the same type of clock change notification. For example, a first device may only support explicit notification while a second device does not support explicit notification. In this situation, the first device may change its transmission clock rate without notifying the second device. That is, the first device may transmit a subsequent frame at its newly selected clock rate. In contrast, the second device will transmit a clock rate change notification using its previously selected clock rate before transmitting a subsequent frame at its newly selected clock rate. This may also apply for embodiments in which one device supports both notification methods while the other does not.

Figure 11:
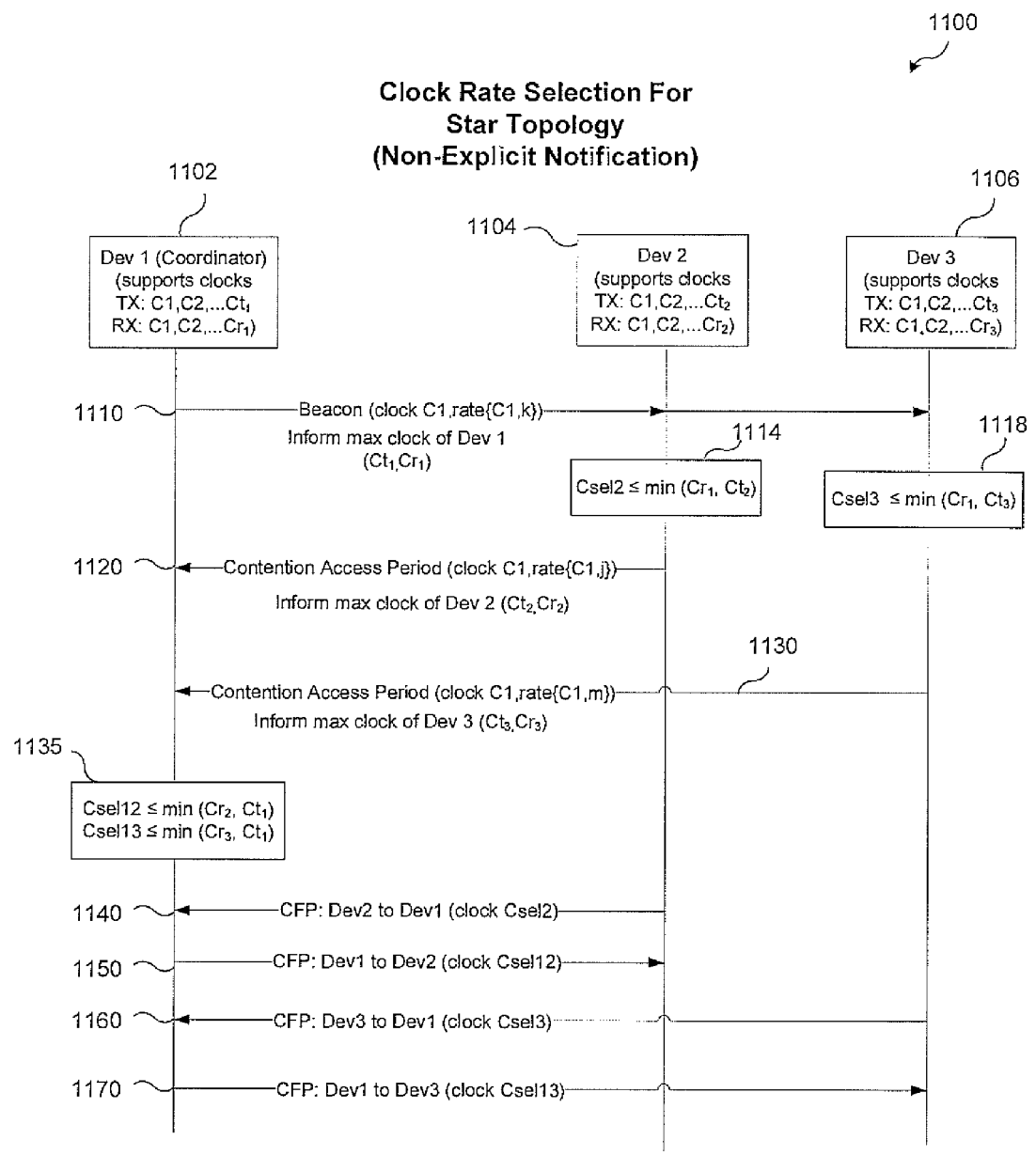
FIG. 11 illustrates a process for automatically determining the clock rate for transmission in a star network according to an embodiment of the present disclosure.

FIG. 11 illustrates a process for automatically determining the clock rate for transmission in a star network according to an embodiment of the present disclosure. In process 1100, device 1102 is an infrastructure coordinator (e.g. access point) in a star topology. The star topology in process 1100 is assumed to support a superframe structure that includes a beacon, contention access period (CAP), and contention free periods (CFPs) containing uplink and downlink slots.

In process 1100, the infrastructure coordinator 1102 sends a broadcast message via a beacon 1110, at the slowest clock rate C1, to all nodes in the network, such as devices 1104 and 1106. In addition, the infrastructure coordinator 1102 may inform devices 1104 and 1106 of the clock rates supported by its transmitter and receiver. In an embodiment, the infrastructure coordinator 1102 only informs the devices 1104 and 1106 of the maximum clock rates supported by its transmitter and receiver ($C_{t1}$, $C_{r1}$). As in process 800 for the P2P topology case, devices 1104 and 1106 (i.e. each node) make a clock rate selection decision in blocks 1114 and 1116, respectively. Blocks 1114 and 1116 are analogous to block 835 of process 800.

Upon making the clock rate selections, devices 1104 and 1106 (i.e. each node) use the contention access period (CAP) slots 1120 and 1130 in the superframe to establish a link with the infrastructure coordinator 1102 at the chosen clock rate. That is, devices 1104 and 1106 use selected clock rates Csel2 and Csel3, respectively, to communicate with the infrastructure coordinator 1102. Furthermore, each of the devices 1104 and 1106 provides information regarding its respective supported clock rates (or the maximum clock rates supported by its transmitter and receiver (e.g. $C_{t2}$ and $C_{r2}$ for device 1104; $C_{t3}$ and $C_{r3}$ for device 1106). Thereafter, devices 1104 and 1106 may communicate with the infrastructure coordinator 1102 using Csel2 and Csel3 as the base clocks for future transmissions 1140 and 1160, respectively, to the infrastructure coordinator 1102 during CFPs.

Based on the information received during the CAP, the infrastructure coordinator 1102 selects a clock rate to be used for communicating for the downlink for each node in block 1135. Block 1135 is analogous to block 845 of process 800. That is, the infrastructure coordinator 1102 selects a clock rate Csel12, which is less than or equal to the minimum (i.e. lesser) of the maximum transmitter clock rate ($C_{t1}$) supported by the infrastructure coordinator 1102 and the maximum receiver clock rate ($C_{r2}$) supported by device 1104. Similarly, the infrastructure coordinator 1102 selects a clock rate Csel13, which is less than or equal to the minimum (i.e. lesser) of the maximum transmitter clock rate ($C_{t1}$) supported by the infrastructure coordinator 1102 and the maximum receiver clock rate ($C_{r3}$) supported by device 1106. This process is based on the assumption that the receiver of the infrastructure coordinator 1102 can detect the frame as long as it is sampling at a clock rate at a multiple greater than or equal to that of the transmitter without any a priori knowledge of the transmitter clock rate (e.g., as described with regard to FIG. 9). Thereafter, the infrastructure coordinator may communicate with device 1104 at base clock rate Csel12 and with device 1106 at base clock rate Csel13.

Figure 12:
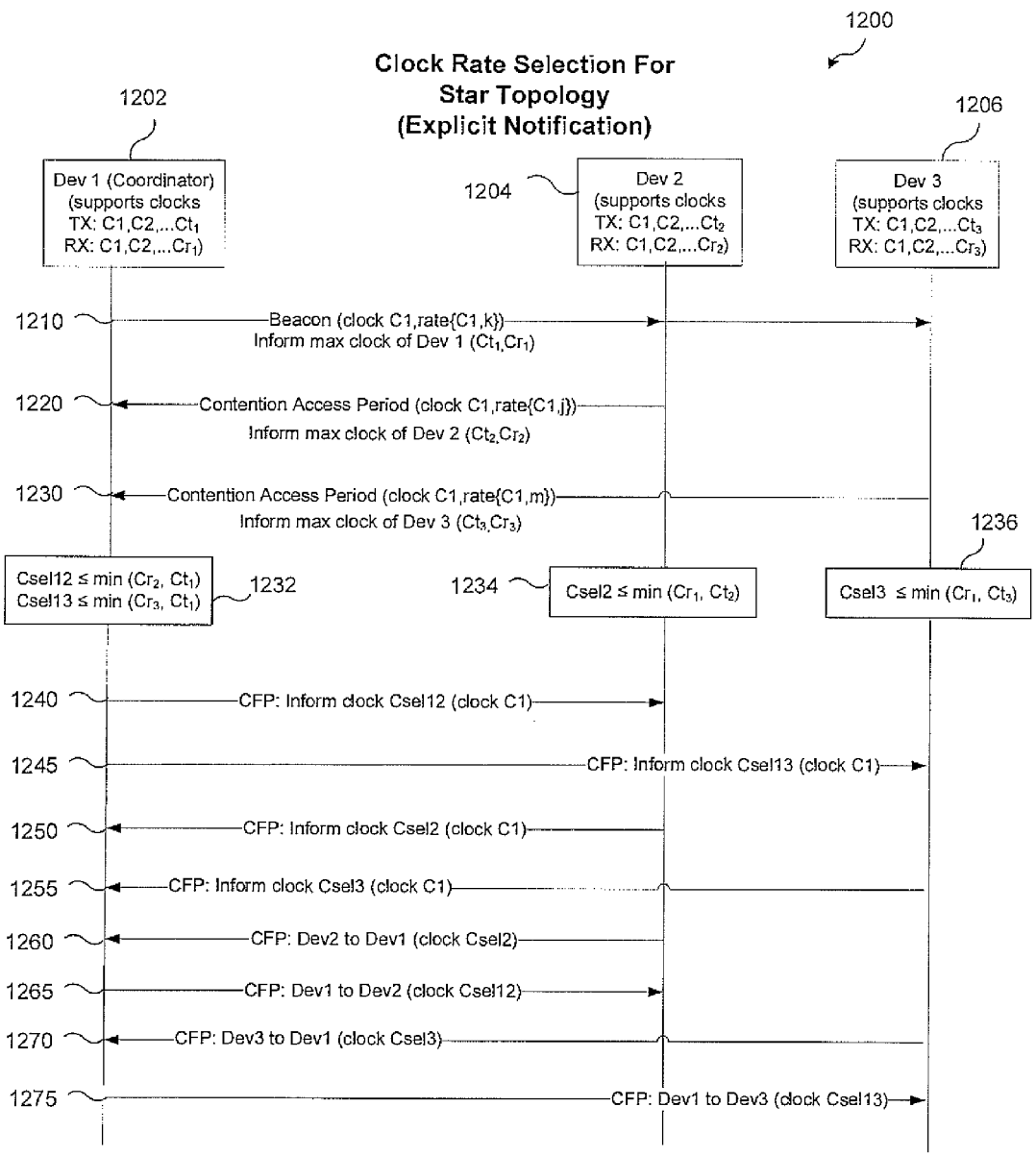
FIG. 12 illustrates a process for manually determining the clock rate for transmission in a star network according to an embodiment of the present disclosure.

FIG. 12 illustrates a process for manually determining the clock rate for transmission in a star network according to an embodiment of the present disclosure. The network topology in process 1200 is similar to the star topology of process 1100, however, the method of clock selection is analogous to process 1000.

In process 1200, infrastructure coordinator 1102 sends a broadcast message via a beacon 1210, at the slowest clock rate C1, to all nodes in the network, such as devices 1204 and 1206. Beacon 1210 is similar to beacon 1110. In addition, the infrastructure coordinator 1202 may inform devices 1204 and 1206 of the clock rates supported by its transmitter and receiver. In an embodiment, the infrastructure coordinator 1202 only informs the devices 1204 and 1206 of the maximum clock rates supported by its transmitter and receiver ($C_{t1}$, $C_{r1}$).

In contrast to process 1200, upon receiving the beacon 1210, devices 1204 and 1206 use slowest clock rate C1 to establish a link with the infrastructure coordinator 1202 during the contention access period (CAP) slots 1220 and 1230 in the superframe. In process 1200, the CAP always uses the lowest clock rate C1 for uplink contention. Furthermore, each of the devices 1204 and 1206 provides information regarding its respective supported clock rates (or the maximum clock rates supported by its transmitter and receiver.

In block 1232, which is similar to block 1135 of process 1100, the infrastructure coordinator 1202 selects clock rates Csel12 and Csel13 for communicating with devices 1204 and 1206, respectively. In blocks 1234 and 1236 (which are analogous to blocks 1114 and 1118 of process 1100), devices 1204 and 1206 select clock rates Csel2 and Csel3, respectively, for communicating with the infrastructure coordinator 1202.

The infrastructure coordinator 1202, still using the slowest clock rate C1, then explicitly provides the selected clock rates Csel12 (for communicating with device 1204) and Csel13 (for communicating with device 1206) to devices 1204 and 1206 during the CFP (1240 and 1245), respectively. The devices 1204 and 1206, also using the slowest clock rate C1, provide their selected clock rates to the infrastructure coordinator 1202 during the CFP (1250 and 1255). Thereafter, the infrastructure coordinator 1202, device 1204, and device 1206 switch to their respective selected clock rates to communicate during the CFP (1260-1275).

While this method has the advantage that each receiver always knows the clock rate at which it will receive data, the disadvantage is that the CAP needs to be much larger because all devices are forced to use the slowest clock rate C1 for CAP, while using higher clock frequencies such as C2 or C3 could reduce the CAP period significantly.

Figure 13:
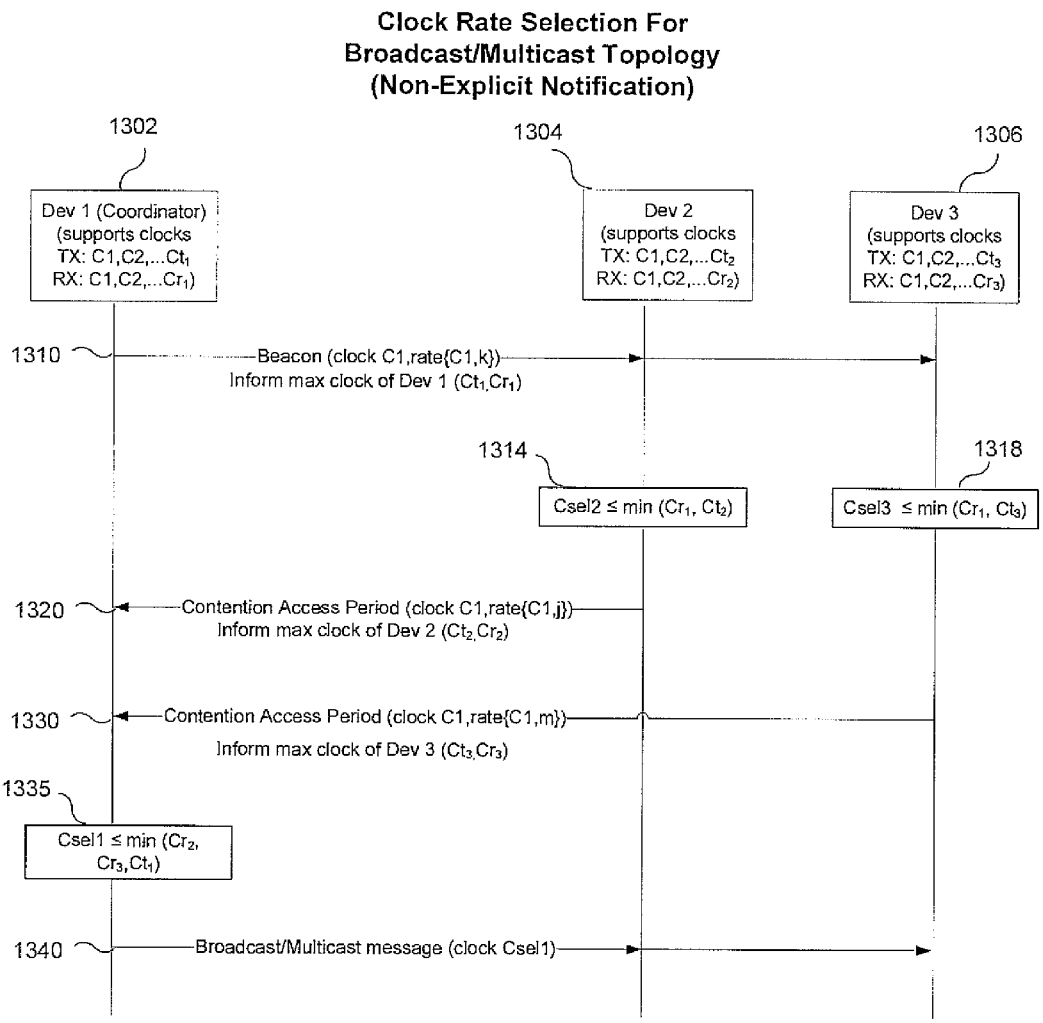
FIG. 13 illustrates a process for automatically determining the clock rate for transmission in a multicast network according to an embodiment of the present disclosure.

FIG. 13 illustrates a process for automatically determining the clock rate for transmission in a multicast network according to an embodiment of the present disclosure. Process 1300 is very similar to process 1100 (directed to the star topology). That is, elements 1310-1330 are identical to elements 1110-1130 of process 1100. In block 1335, the infrastructure coordinator 1302 selects a clock rate Csel1, which is less than or equal to the minimum of the maximum transmitter clock rate ($C_{t1}$) supported by the infrastructure coordinator 1302, the maximum receiver clock rate ($C_{r2}$) supported by device 1304, and the maximum receiver clock rate ($C_{r3}$) supported by device 1306. Thereafter, the infrastructure coordinator 1302 may transmit multicast messages 1340 to devices 1304 and 1306 at base clock rate Csel1.

Figure 14:
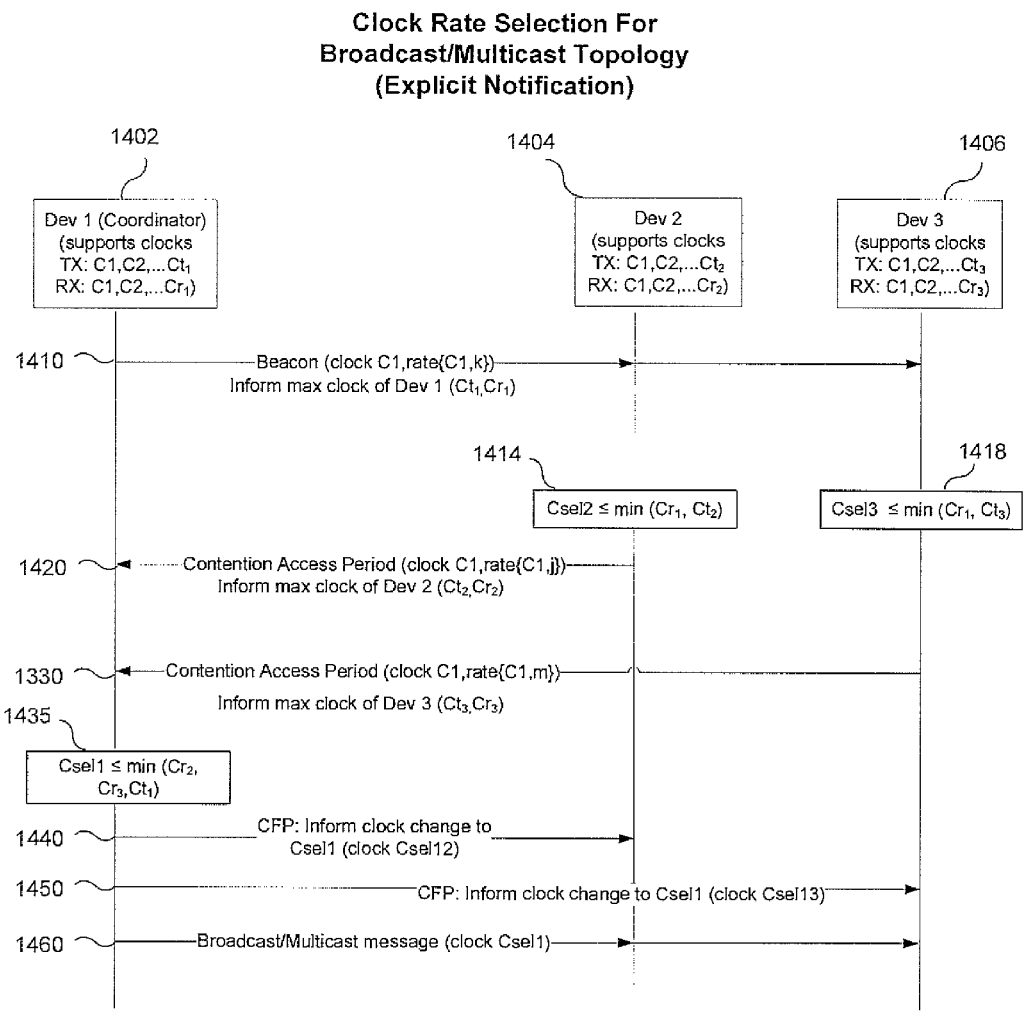
FIG. 14 illustrates a process for manually determining the clock rate for transmission in a multicast network according to an embodiment of the present disclosure.

FIG. 14 illustrates a process for manually determining the clock rate for transmission in a multicast network according to an embodiment of the present disclosure. Process 1400 is very similar to process 1200 (directed to the star topology). That is, elements 1410-1430 are identical to elements 1210-1230 of process 1200. In block 1432, the infrastructure coordinator 1402 selects a clock rate Csel1, which is less than or equal to the minimum of the maximum transmitter clock rate ($C_{t1}$) supported by the infrastructure coordinator 1402, the maximum receiver clock rate ($C_{r2}$) supported by device 1404, and the maximum receiver clock rate ($C_{r3}$) supported by device 1406. In blocks 1434 and 1436, which are identical to blocks 1234 and 1236 of process 1200, devices 1404 and 1406 select clock rates Csel2 and Csel3, respectively, for communicating with the infrastructure coordinator, 1402. The infrastructure coordinator 1402, still using the slowest clock rate C1, then explicitly provides the selected clock rate Csel1 to devices 1204 and 1206 during the CFP (1440 and 1450). Thereafter, the infrastructure coordinator 1402 may transmit multicast messages 1460 to devices 1404 and 1406 at base clock rate Csel1.

Mechanisms Needed to Support Clock Rate Change

The maximum clock rates for transmission and reception supported by a device may be communicated as part of the MAC capabilities information exchange (IE). The MAC capabilities information may be sent during device association. In some embodiments, the MAC capabilities information may be included in the Association Request and/or the Association Response. This can also be sent in the beacon message. In an embodiment, the capabilities information in the Association Response may constitute a capabilities negotiation response. In an embodiment, a VLC device may support all specified clock rates less than or equal to the maximum clock rates for transmission and reception, respectively.

In an embodiment, additional bits may be added to an existing structure of the MAC capabilities IE. An example is shown in Table 4. That is, three bits (bits 9-11) may be used for a modulation and coding scheme identification (MCS ID) that indicates up to eight different clock rates for the maximum optical clock rate supported by the transmitter, and the other three bits (bits 12-14) may be used for an MCS ID that indicates up to eight different clock rates for the maximum optical clock rate supported by the receiver. This is merely one embodiment and is not intended to limit the scope of the present disclosure. Additional bits may be added if more clock rates are supported, and fewer bits may be added if fewer clock rates are supported. Alternatively, this may also be mentioned as part of the PHY capabilities field

TABLE 4

Example Of MAC Capabilities IE Showing Support For Clock Rate Range

| Bit | Attribute | Description |
|---|---|---|
| 0 | Traffic support | 0 = unidirectional (broadcast only)<br>1 = bi-directional |
| 1-2 | Topology | 00 = reserved<br>10 = P2P only<br>01 = P2MP support<br>11 = both |
| 3-4 | Device type | 00 = infrastructure<br>01 = mobile<br>10 = vehicle<br>11 = reserved |
| 5 | Beacon capability | 1 = capable |
| 6 | Visibility support | 1 = support |
| 7 | Dimming support | 1 = support |
| 8 | Co-ordinator support | 1 = support, can act as co-ordinator for VLAN |
| 9-11 | Max supported TX clock | 000 - lowest clock rate, 001 - next highest clock, . . . |
| 12-14 | Max supported RX clock | 000 - lowest clock rate, 001 - next highest clock, . . . |
| 15 | Reserved | |

A clock rate change notification could be added as part of the MAC command frame. This is shown in Table 5.

TABLE 5

Clock Rate Change Notification

| Command Frame Identifier | Command Name |
|---|---|
| 0x01 | Association request |
| 0x02 | Association response |
| 0x03 | Disassociation notification |
| 0x04 | Data request |
| 0x05 | PAN ID conflict notification |
| 0x06 | Orphan notification |
| 0x07 | Beacon request |
| 0x08 | Coordinator realignment |
| 0x09 | GTS request |
| 0x0a | Blinking notification |
| 0x0b | Dimming notification |
| 0x0c | Fast link recovery signaling |
| 0x0d | Mobility notification |
| 0x0e | Information element exchange |
| 0x0f | Clock rate change notification |
| 0x10-0xff | Reserved |

The command format for the clock rate change notification is as shown in Table 6. This clock rate change notification is sent at the current clock rate negotiated between the devices. All future communications will occur at this new clock rate.

TABLE 6

Clock Rate Change Notification Command Format

| Octets: 7 | 1 | 1 |
|---|---|---|
| MAC Header Fields | Command Frame Identifier | New clock rate for future TX |

Tables 7 and 8 show an example data rate tables for PHY I and PHY II based on the clock rates. As can be seen, there are multiple data rates associated with each clock rate.

TABLE 7

Example Data Rate For PHY I Based On Clock Rates

| | Optical Rate | Modulation | Line Coding | FEC | Data Rate |
|---|---|---|---|---|---|
| PHY I | 200 kHz | OOK | Manchester | 1/16 | 6.25 kbps |
| | | | | 1/8 | 12.5 kbps |

TABLE 7-continued

Example Data Rate For PHY I Based On Clock Rates

| Optical Rate | Modulation | Line Coding | FEC | Data Rate |
|---|---|---|---|---|
| | | | ¼ | 25 kbps |
| | | | ½ | 50 kbps |
| | | | 1 | 100 kbps |
| 400 kHz | VPM | 4B6B | ⅛ | 33 kbps |
| | | | ¼ | 67 kbps |
| | | | ½ | 133 kbps |
| | | | 1 | 266 kbps |

TABLE 8

Data rate table for high rate PHY based on clock rate

| | Modulation | Line Coding | FEC | Optical Rate | Data Rate |
|---|---|---|---|---|---|
| PHY II | VPM | 4B6B | ½ | 3.75 MHz | 1.5 Mbps |
| | | | ⅘ | | 2.4 Mbps |
| | | | ½ | 7.5 MHz | 3 Mbps |
| | | | ⅘ | | 4.8 Mbps |
| | OOK | 8B10B | ½ | 15 MHz | 6 Mbps |
| | | | ⅘ | | 9.6 Mbps |
| | | | ½ | 30 MHz | 12 Mbps |
| | | | ⅘ | | 19.2 Mbps |
| | | | ½ | 60 MHz | 24 Mbps |
| | | | ⅘ | | 38.4 Mbps |
| | | | ½ | 120 MHz | 48 Mbps |
| | | | ⅘ | | 76.8 Mbps |
| | | | 1 | | 96 Mbps |

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of optical clock rate negotiation to support asymmetric clock rates for visible light communication (VLC) in a first device, the method comprising:
transmitting at a predetermined clock rate a first frame comprising at least one receiver clock rate supported by the first device;
receiving a response frame from a second device comprising at least one receiver clock rate supported by the second device;
selecting a transmission clock rate of the first device based on the response frame from the second device; and
transmitting subsequent frames for data communication to the second device at the selected transmission clock rate of the first device, wherein the first frame comprises an association request that comprises capabilities information of the first device, the capabilities information of the first device comprises a plurality of receiver clock rates supported by the first device, the response frame comprises an association grant from the second device that comprises capabilities information of the second device, and the capabilities information of the second device comprises a plurality of receiver clock rates supported by the second device.

2. The method of claim 1, further comprising:
determining whether one of an explicit and a non-explicit notification process is used for transmission clock rate changes based on at least one of the capabilities information of the first device and the capabilities information of the second device;
when the explicit notification method is used by the first device, receiving the response frame at the predetermined clock rate, and determining a selected transmission clock rate of the second device based on a clock rate change notification from the second device; and
when the non-explicit notification is used by the first device, receiving the response frame at the selected transmission clock rate of the second device, and determining the selected transmission clock rate of the second device by sampling the response frame.

3. The method of claim 1, wherein:
the predetermined clock rate is the lowest clock rate that is known to be supported by the first and second devices,
the receiver clock rate indicated by the second device is the maximum receiver clock rate of the second device, and
all known clock rates that are less than or equal to the maximum clock rate of at least one of the transmitter and receiver of the first device are also supported in the first device.

4. The method of claim 3, wherein selecting the transmission clock rate of the first device based on the response frame from the second device comprises:
selecting one of a set of all known clock rates that is less than or equal to a minimum clock rate between the maximum receiver clock rate of the second device and a maximum transmission clock rate of the first device; and
when an explicit notification method is used, sending a clock rate change notification to the second device using one of the predetermined clock rate and a previously selected transmission clock rate, the clock rate change notification comprising the selected transmission clock rate of the first device.

5. The method of claim 4, wherein:
a modulation and coding scheme ID is used as an indicator for the selected transmission clock rate of the first device for subsequent frames,
a preamble, a header, a payload for each subsequent frame sent to the second device is transmitted at the selected transmission clock rate of the first device, and
the header for each subsequent frame transmitted to the second device is sent at the lowest data rate that corresponds to the selected transmission clock rate of the first device.

6. The method of claim 1, wherein the first device is an infrastructure coordinator in a star topology, the first frame comprises a beacon transmitted at the lowest clock rate supported by all devices, the response frame is received from the second device during a contention access period (CAP), which is also transmitted at the lowest clock rate supported by all devices, and the subsequent frames are transmitted to the second device during contention free periods (CFPs), where the optical clock rate can be varied between each pair of coordinator and associated devices in both directions.

7. The method of claim 6, wherein the predetermined clock rate is the lowest clock rate that is known to be supported by the infrastructure coordinator and the second device, and clock change notifications and subsequent frames are transmitted during CFPs.

8. The method of claim 1, wherein the first device is an infrastructure coordinator in a multicast topology, the first frame comprises a beacon, the response frame is received from the second device during a contention access period (CAP), and the subsequent frames are transmitted to the second device during contention free periods.

9. The method of claim 8, further comprising:
receiving a response frame from a third device during the contention access period, the response from the third device comprising a third receiver clock rate supported by the third device,
wherein selecting the first transmission clock rate of the first device further comprises selecting a minimum clock rate between the second receiver clock rate supported by the second device, the third receiver clock rate supported by the third device, and the maximum transmission clock rate supported by the first device, and
wherein subsequent frames are transmitted to the second and third devices at the first transmission clock rate of the first device.

10. An apparatus for optical clock rate negotiation to support asymmetric clock rates for visible light communication (VLC) in a first device, the apparatus comprising:
a transmitter comprising an optical source and configured to transmit VLC signals; and
a receiver comprising a photodetector and configured to receive VLC signals; and
a controller coupled to the transmitter and receiver, the controller configured to:
transmit at a predetermined clock rate a first frame comprising at least one receiver clock rate supported by the first VLC device,
receive a response frame from a second device comprising at least one receiver clock rate supported by the second device,
select a transmission clock rate of the first device based on the response frame from the second device, and
transmit subsequent frames for data communication to the second device at the selected transmission clock rate of the first device, wherein the first frame comprises an association request that comprises capabilities information of the first device, the capabilities information of the first device comprises a plurality of receiver clock rates supported by the first device, the response frame comprises an association grant from the second device that comprises capabilities information of the second device, and the capabilities information of the second device comprises a plurality of receiver clock rates supported by the second device.

11. The method of claim 1, wherein the first device is an infrastructure coordinator in a star topology, the first frame comprises a beacon transmitted at the lowest clock rate supported by all devices, the response frame is received from the second device during a contention access period (CAP), which is also transmitted at the lowest clock rate supported by all devices, and the subsequent frames are transmitted to the second device during contention free periods, wherein the optical clock rate can be varied between each pair of coordinator and associated devices in both directions.

12. The apparatus of claim 10, wherein the controller is further configured to:
determine whether one of an explicit and a non-explicit notification process is used for transmission clock rate changes based on at least one of the capabilities information of the first device and the capabilities information of the second device;
when the explicit notification method is used by the first device, receive the response frame at the predetermined clock rate, and determine a selected transmission clock rate of the second device based on a clock rate change notification from the second device; and
when the non-explicit notification is used by the first device, receive the response frame at the selected transmission clock rate of the second device, and determine the selected transmission clock rate of the second device by sampling the response frame.

13. The apparatus of claim 10, wherein:
the predetermined clock rate is the lowest clock rate that is known to be supported by the first and second devices,
the receiver clock rate indicated by the second device is the maximum receiver clock rate of the second device, and
all known clock rates that are less than or equal to the maximum clock rate of at least one of the transmitter and receiver of the first device are also supported in the first device.

14. The apparatus of claim 13, wherein when selecting the transmission clock rate of the first device based on the response frame from the second device, the controller is further configured to:
select one of a set of all known clock rates that is less than or equal to a minimum clock rate between the maximum receiver clock rate of the second device and a maximum transmission clock rate of the first device; and
when an explicit notification method is used, send a clock rate change notification to the second device using one of the predetermined clock rate and a previously selected transmission clock rate, the clock rate change notification comprising the selected transmission clock rate of the first device.

15. The apparatus of claim 14, wherein:
the controller uses a modulation and coding scheme ID as an indicator for the selected transmission clock rate of the first device for subsequent frames,
the controller sends a preamble, a header, a payload for each subsequent frame transmitted to the second device at the selected transmission clock rate of the first device 1, and
the controller sends the header for each subsequent frame transmitted to the second device at the lowest data rate that corresponds to the selected transmission clock rate of the first device.

16. The apparatus of claim 10, wherein the first device is an infrastructure coordinator in a star topology, the first frame comprises a beacon transmitted at the lowest clock rate supported by all devices, the response frame is received from the second device during a contention access period (CAP), which is also transmitted at the lowest clock rate supported by all devices, and the subsequent frames are transmitted to the second device during contention free periods, wherein the optical clock rate can be varied between each pair of coordinator and associated devices in both directions.

17. The apparatus of claim 16, wherein the predetermined clock rate is the lowest clock rate that is known to be supported by the infrastructure coordinator and the second device, and the controller transmits the clock change notifications and subsequent frames during the contention free period (CFP).

18. The apparatus of claim 10, wherein the first device is an infrastructure coordinator in a multicast topology, the first frame comprises a beacon, the response frame is received from the second device during a contention access period (CAP), and the subsequent frames are transmitted to the second device during contention free periods (CFPs).

19. The apparatus of claim 18, wherein the controller is further configured to:
receive a response frame from a third device during the contention access period, the response from the third device comprising a third receiver clock rate supported by the third device, wherein the controller selects the first transmission clock rate of the first device by selecting a minimum clock rate between the second receiver clock rate supported by the second device, the third receiver clock rate supported by the third device, and the maximum transmission clock rate supported by the first device, and wherein subsequent frames are transmitted to the second and third devices at the first transmission clock rate of the first device.

20. The apparatus of claim 10, wherein the first device is an infrastructure coordinator in a star topology, the first frame comprises a beacon transmitted at the lowest clock rate supported by all devices, the response frame is received from the second device during a contention access period (CAP), which is also transmitted at the lowest clock rate supported by all devices, and the subsequent frames are transmitted to the second device during contention free periods, wherein the optical clock rate can be varied between each pair of coordinator and associated devices in both directions.

21. A method for supporting multiple clocks in a PHY layer of a first visible light communication (VLC) device, the method comprising: transmitting a first portion of a frame at a first clock rate, the first portion of the frame comprising a first locking pattern and a header comprising a second clock rate; and transmitting a second portion of the frame at the second clock rate, the second portion of the frame comprising a second locking pattern and a payload, wherein the second locking pattern comprises a re-locking portion and a delimiter portion, and wherein the re-locking portion comprises a first maximum transition sequence, and the delimiter portion comprises a second maximum transition sequence that is opposite to the first maximum transition sequence.

22. The method of claim 21, wherein the first clock rate is lower than the second clock rate.

23. The method of claim 21, wherein the length of the second locking pattern increases as a difference between a base clock rate and a payload clock rate increases.

24. The method of claim 21, wherein the second locking pattern is a 16-bit pattern in which each of the re-locking portion and the delimiter portion comprises an 8-bit maximum transition sequence.

25. An apparatus for supporting multiple clocks in a MAC layer of a first visible light communication (VLC) device, the apparatus comprising:

a transmitter comprising an optical source and configured to transmit VLC signals; and a controller coupled to the transmitter, the controller configured to:

transmit a first portion of a frame at a first clock rate, the first portion of the frame comprising a first locking pattern and a header comprising a second clock rate, and transmit a second portion of the frame at the second clock rate, the second portion of the frame comprising a second locking pattern and a payload, wherein the second locking pattern comprises a re-locking portion and a delimiter portion, and wherein the re-locking portion comprises a first maximum transition sequence, and the delimiter portion comprises a second maximum transition sequence that is opposite to the first maximum transition sequence.

26. The apparatus of claim 25, wherein the first clock rate is lower than the second clock rate.

27. The apparatus of claim 25, wherein the length of the second locking pattern increases as a difference between a base clock rate and a payload clock rate increases.

28. The apparatus of claim 25, wherein the second locking pattern is a 16-bit pattern in which each of the re-locking portion and the delimiter portion comprises an 8-bit maximum transition sequence.

* * * * *